United States Patent [19]

Graham et al.

[11] Patent Number: 4,602,058
[45] Date of Patent: Jul. 22, 1986

[54] COMPATIBILITY AND STABILITY OF BLENDS OF POLYAMIDE AND ETHYLENE COPOLYMERS

[75] Inventors: Stephen L. Graham, Richwood; Laura A. Kelly, Clute, both of Tex.

[73] Assignee: The Dow Chemical Company, Midland, Mich.

[21] Appl. No.: 627,327

[22] Filed: Jul. 2, 1984

[51] Int. Cl.$^4$ .......................... C08K 5/17; C08K 5/09; C08L 33/02; C08L 77/00

[52] U.S. Cl. .................................... 524/320; 428/290; 428/435; 428/458; 428/473.5; 428/479.6; 524/239; 524/298; 524/321; 524/322; 524/514; 525/183

[58] Field of Search ............... 524/514, 320, 321, 322, 524/239, 298

[56] References Cited

U.S. PATENT DOCUMENTS

| | | | |
|---|---|---|---|
| 3,000,851 | 9/1961 | Schweitzer | 524/321 |
| 3,037,955 | 6/1962 | Carman | 524/321 |
| 3,620,878 | 11/1971 | Guthrie | 524/321 |
| 3,719,641 | 3/1973 | Campbell | 524/321 |
| 4,105,709 | 8/1978 | Iwami | 524/514 |
| 4,220,733 | 9/1980 | Jones | 524/514 |
| 4,299,744 | 11/1981 | Stewart | 525/183 |
| 4,310,638 | 1/1982 | Coran | 524/514 |
| 4,314,929 | 2/1982 | Mahoney | 524/514 |
| 4,408,000 | 10/1983 | Lee | 524/322 |
| 4,421,892 | 12/1983 | Kasahara | 524/514 |
| 4,435,535 | 3/1984 | Grimm | 524/321 |
| 4,436,872 | 3/1984 | Flood | 525/183 |
| 4,478,978 | 10/1984 | Roura | 525/183 |
| 4,500,664 | 2/1985 | McKinney | 524/239 |

FOREIGN PATENT DOCUMENTS

| | | | |
|---|---|---|---|
| 56-4652 | 1/1981 | Japan | 524/514 |
| 2052528 | 1/1981 | United Kingdom | 524/514 |

*Primary Examiner*—C. Warren Ivy
*Attorney, Agent, or Firm*—W. J. Lee

[57] ABSTRACT

The compatibility and thermal stability of blends of polyamides/carboxyl-containing ethylene polymers is improved by adding thereto an organic carboxylic acid compound, especially di-basic acids such as sebacic acid or tartaric acid. The blends may also contain free-radical scavengers and/or antioxidants. These blends are useful as heat-plasticized adhesives or bonding agents.

15 Claims, No Drawings

COMPATIBILITY AND STABILITY OF BLENDS OF POLYAMIDE AND ETHYLENE COPOLYMERS

FIELD OF THE INVENTION

This pertains to improvements in compatibility and thermal stability of blends or alloys comprising polyamides and ethylene copolymers containing carboxyl functional groups by the addition thereto of stabilizing agents containing carboxylic groups.

BACKGROUND OF THE INVENTION

Polyamides are well known commercial polymers wherein the structural units are linked by amide groupings (CO—NH) or (CO—R—NH).

Some polyamides are known for their fiber-forming ability, such as those called by the sub-generic term "nylon" which are represented by the structure

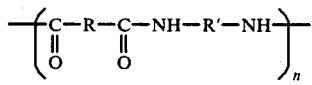

where R and R' represent, independently, one or more methylene groups and n is a plural number commensurate with, or indicative of, the molecular weight. These nylon resins are prepared by polymerizing a diamine with a diacid; nylons 6/6, 6/9, 6/10, and 6/12, e.g., belong in this classification.

Other nylons, e.g., nylons 6, 11, and 12 are prepared by polymerizing amino acids or amino acid derivatives. The highly commercialized nylon 6 is polymerized from the 6-carbon amino acid derivative, caprolactam:

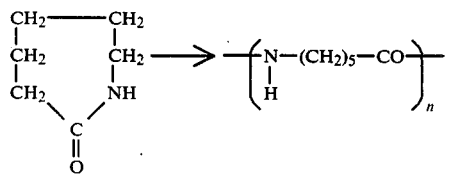

Other polyamides, known as poly(amide-imide) are polymers based on reactions of tremellitic anhydride with aromatic diamines. Whereas nylons are all polyamides, not all polyamides are nylons.

It is within the purview of the presently claimed invention, to employ, as a starting material of the blend, any normally solid, substantially uncrosslinked polyamide which contains, as recurring groups, an amine nitrogen attached to a carbonyl. A convenient reference for further general information about nylons and polyamides is MODERN PLASTICS ENCYCLOPEDIA published recurringly by McGraw-Hill. The MERCK INDEX contains a limited amount of information about "nylon".

The ethylene/carboxyl containing copolymers used in the present invention are commercially available, especially those of the type known as "interpolymers", but may also be of the type known as "graft copolymers" and "block copolymers". These expressions are known to practitioners of the art. Interpolymers are made by polymerizing a mixture of the monomers; graft copolymers are made by grafting olefin acid groups onto a polyethylene chain; block copolymers are those wherein long polymer chains comprise chain segments of a polymerized plurality of ethylene units and segments of a polymerized plurality of the carboxyl-containing monomer units.

As used herein the expression "olefin acids" refers to olefinically-unsaturated carboxylic acids which are copolymerizable with ethylene, especially acrylic acid, methacrylic acid, crotonic acid, and 1-butenoic acid, most especially acrylic acid and methacrylic acid.

Patents which disclose interpolymerizations of ethylene and unsaturated carboxylic acids in a steady state reaction at high temperature and high pressure in a stirred reactor in the presence of a free-radical initiator are, e.g., Canadian Pat. No. 655,298 (and its U.S. counterpart U.S. Pat. No. 4,351,931): U.S. Pat. No. 3,239,370; U.S. Pat. No. 3,520,861; U.S. Pat. No. 3,658,741; U.S. Pat. No. 3,884,857; U.S. Pat. No. 3,988,509; U.S. Pat. No. 4,248,990; and U.S. Pat. No. 4,252,924.

U.S. Pat. No. 3,239,370 discloses a random copolymerization of ethylene with an unsaturated carboxylic acid (e.g. acrylic acid) in a stirred autoclave operated at 16,000 psi, and 210° C. using a peroxy initiator, the so-formed copolymer being particularly useful as a coating for non-metallic substrates.

U.S. Pat. No. 3,520,861 discloses a substantially homogeneous, compositionally uniform, random copolymer of ethylene/unsaturated acid (e.g. acrylic acid, methacrylic acid, crotonic acid) prepared in a continuous manner in a stirred autoclave at high pressure and elevated temperature, using a free-radical initiator (such as a peroxide). The temperature of the polymerization is disclosed as being in the range of about 120° C. to about 300° C., preferably about 150° C. to about 250° C. The pressure of the polymerization is disclosed as being in the range of at least 1000 atmospheres, preferably between about 1000–3000 atmospheres, esp. between 1100–1900 atmospheres.

Canadian Pat. No. 655,298 and its U.S. counterpart (U.S. Pat. No. 4,351,931) discloses homogeneous, compositionally uniform, random copolymers of ethylene and unsaturated carboxylic acids (e.g. acrylic acid) wherein said copolymer comprises at least about 90% by weight of ethylene with a melt index of 0.01 to 30 g/10 minutes. The copolymers are prepared in a well-stirred reactor at a pressure of at least 1000 atmospheres, at 90°–280° C., using a free radical initiator, while maintaining the ratio of monomers (ethylene/acid) in the range of 10,000/1 to 50/1 by weight, the process being performed continuously by feeding monomers in, while removing reaction mixture, are maintaining a constant reaction environment. U.S. Pat. No. 4,351,931 discloses reaction of such copolymers with diamines and polyamides to yield condensation polymers.

U.S. Pat. No. 3,658,741 discloses homogeneous copolymers of ethylene and unsaturated carboxylic acids and esters, prepared in the presence of a chain transfer agent, a free radical catalyst, a temperature between 100° C.–300° C. and pressure between 100 and 1000 atmospheres, using turbulent agitation; the reaction is said to take place in the vapor phase and prepares very low mol. wt. copolymers.

U.S. Pat. No. 3,884,857 and U.S. Pat. No. 3,988,509 disclose the preparation of copolymers, such as ethylene/acrylic acid copolymers in a continuous, high pressure, free-radical polymerization process, at 100°–250° C. and 1000–2500 atmospheres of pressure.

U.S. Pat. No. 4,248,990 discloses copolymers, e.g. ethylene/acrylic acid copolymers which are said to distinguish over the random copolymers of Canadian Pat. No. 655,298 and of U.S. Pat. No. 3,520,861 by virtue of being non-random. This non-randomness is said to be the result of operating the steady state, high pressure, stirred reactor at a pressure of from 0 to about 500 psi above, and at temperature of from 0°–15° C. above, that needed to maintain a single phase reaction mixture at the given concentration of copolymer in the reaction mixture and at the given acid comonomer content of the copolymer.

U.S. Pat. No. 4,252,924 discloses the preparation of non-random copolymers, e.g. ethylene/acrylic acid copolymers in at least two constant environment, stirred autoclaves in series, each using a single phase reaction mixture, but where each succeeding autoclave is maintained at a temperature of at least 30° C. above that of the preceding autoclave.

U.S. Pat. No. 3,484,403; U.S. Pat. No. 4,018,733; and U.S. Pat. No. 4,132,690 disclose blends of polyamides with ethylene copolymers, along with compatibilizers.

SUMMARY OF THE INVENTION

The thermal stability and compatibility of blends comprising polyamides and ethylene polymers containing carboxyl groups is improved by incorporating therein a stabilizing agent containing carboxylic acid groups. Preferably, the stabilizing agent is a dibasic acid.

These blends are useful as heat-plasticized adhesives or bonding agents.

DETAILED DESCRIPTION

In particular, the present invention relates to the inclusion of low molecular weight, low melting mono-, di-, or multi-functional organic acids (e.g. sebacic acid) to improve compatibility and inhibit "interactive crosslinking" between the polyamide and the ethylene carboxyl-containing copolymer.

In this disclosure "compatibility" is defined as being able to form a homogeneous mixture that neither separates nor is altered by chemical interaction. "Thermal stability" is defined as being able to withstand elevated processing temperatures for an appreciable time without a significant change in viscosity or physical properties.

It is an object of the present invention to provide mixtures of polyamides and ethylene copolymers containing carboxyl groups which form compatible, homogeneous blends and which are thermally stable for extended periods of time, whereby the blends may be held at molten temperature without undergoing any substantial or appreciable degradation, crosslinking, gelation, or other viscosity-altering reactions. This object is substantially and effectively attained by incorporation into the blending process, as a portion of the blend, an organic carboxylic acid, especially a di-carboxylic acid as discussed in detail hereinafter.

It is known that one may prepare blends of carboxyl-containing ethylene copolymers with polyamide resins to obtain such properties as high modulus, toughness, and elongation or to obtain superior adhesive properties for use in various hot melt adhesive and coating applications. However, these blends are limited in utility due to their inherent thermal instability and incompatibility of each of the components. In a molten state (at typical compounding and applications temperatures of, e.g., $\geq 149°$ C.) the amine-functionality of the polyamide is free to react with pendant carboxyl groups on the polymer forming a crosslink. This results in gel formation and high viscosities, rendering the formulations useless.

This invention differs from prior art in that it employs a unique method used to considerably improve the stability and promote compatibility of the formulation. This allows the development of new polyamide/carboxyl functions alloys that will have workable viscosities at application temperatures for several hours. This is ideal for systems where the formulation is kept in molten reservoirs prior to application. Even in melt-on-demand systems, voids can occur in the system, allowing stagnant hot melt to remain in the equipment and later be carried out with fresh material, causing contamination unless steps are taken to prevent interaction of gelation in the reservoir or else physically remove the residue. Extending the time period in which the material can be kept molten, without encountering appreciable deleterious effects, is sometimes referred to as "extending the pot-life".

This invention provides improvements in the compatibility and thermal stability of polyamides when alloyed with carboxyl-containing functional polymers. This invention shows that a low molecular weight mono-, di- or multi-functional acid (e.g. dicarboxylic acid) can be added to polyamide/carboxyl functional polymer blends and will reduce or prevent gelation. Preventing gelation means: first, that the polyamide/carboxyl function polymer blends are now more thermally stable; second, polyamides can now be alloyed with, and at a higher level of, carboxyl functional polymers than previously thought possible.

The typical polyamides of this invention are generally produced via the condensation reaction of diamines (ex. hexamethylene-diamine) and dibasic acids (e.g. adipic acids), or by polymerization of lactams (caprolactam) or amino acids. The resultant polyamides are either left amine-terminated or in some cases acid-terminated. When ethylene carboxyl containing polymers such as ethylene acrylic acid copolymers are admixed-/alloyed with polyamides and subjected to high temperatures (i.e., about 149° C. or more) the amide functionality of the polyamide will interact with the pendant carboxyl functionality of the carboxyl-functional polymer to yield severe crosslinking and gelation.

A similar problem also occurs with acid-terminated polyamides. Polyamides principally degrade via non-oxidative free-radical chain-scission which exposes the respective amine moiety. As with the example above, the carboxyl functional polymer can then easily react with the amine functionality of the polyamide.

This problem is preferably alleviated by including low molecular weight dicarboxylic acids in the formulation to limit the reaction between the polyamides and the EAA copolymer. The dicarboxylic acid may correspond to the following formula: HOOC—R—COOH, wherein R is $C_1$–$C_{14}$ alkylene or alkenylene or OH substituted $C_1$–$C_{14}$ alkylene or alkenylene or combinations of these.

Examples of di-carboxylic acids are: oxalic acid; malonic acid; succinic acid; glutaric acid; adipic acid; pimelic acid; suberic acid; azelaic acid; sebacic acid; dodecanedoic acid; 1,11-undecanedicarboxylic acid; 1,12-undecanedicarboxylic acid; hexadecandoic acid, tartaric acid; maleic acid; and the like. Sebacic acid and tartaric acid are especially preferred.

It is within the purview of the present invention to employ any organic carboxylic acid as the beneficial additive to the polyamide/copolymer blend, so long as it will substantially melt in, or dissolve in, the blend at the temperature employed for the blending operation and, in the process, react with any functional amine groups which are present at the blending temperature, or which become available through chain scission or degradation of the polyamide at such temperatures.

Mono-carboxylic acids are generally not as preferred as the di-carboxylic acids or other multicarboxylic acids, but some modicum of success is to be expected from these acids for the purposes of this invention, e.g., improving the compatibility and thermal stability of the polyamide/copolymer blends. Generally, the organic acids are represented by the formula R—COOH, where R represents an organic moiety having 1 to about 20 carbon atoms.

The said R—COOH compounds include those in which the —COOH group is a terminal group or is on a non-terminal carbon. Fatty acids are included, as well as hydroxy acids such as glycollic acid, lactic acid, and the like.

Multi-carboxylic acids include those having 3 —COOH groups, such as citric acid, or those having 4 —COOH groups, such as pyromellitic acid or ethylenediamine tetraacetic acid (EDTA), or low molecular weight oligomers of acrylic acid or methacrylic acid, and the like.

Good flowability and low viscosities are essential for successful hot melt and coating applications. Crosslinking or part gelation results in extremely high viscosity and poor flow characteristics. This invention provides thermal stability of polyamides (acid- and amine-terminated) and ethylene carboxyl-containing polymer alloys which are significantly improved and, as a result of this invention, these alloys can produce commercially viable systems.

A unique and unexpected result of this invention is the ability to alloy ethylene carboxyl-containing polymers with polyamides (amine-terminated) that were previously impossible plus alloying "higher levels" of ethylene carboxyl-containing polymers with polyamides (amine- and acid-terminated) before a compatibility problem is reached. We are defining compatibility as being able to form a homogeneous mixture that neither separates nor is altered by a chemical interaction. This unique and unexpected ability allows new and useful alloys of polyamides and ethylene carboxyl-containing polymers for diverse property performance.

It is important for optimizing the success of this invention that both components (polyamides and ethylene carboxyl-containing polymers) be thermally stabilized themselves. As already mentioned, polyamides principally degrade via non-oxidative free-radical chain-scission which exposes the respective amine moiety. The ethenic portion of the ethylene carboxyl-containing polymers can degrade via oxidative and non-oxidative free radical crosslinking as well as chain-scission. The carboxyl portion, such as in the instance of ethylene/acrylic acid copolymers, tend to form intra- and intermolecular anhydride crosslinks via a dehydration reaction when subjected to elevated temperatures. These anhydrides can also undergo a chain-scission, decarboxylation reaction at higher temperatures. Since the formation of free-radicals is intermediate to ultimate degradation of both polyamides and ethylene carboxyl-containing interpolymers, well-known free-radical scavengers (which are commonly sterically hindered phenolic stabilizers) are typically successfully used to impart improved thermal stability. However, the singular use of free-radical scavengers is ineffective for polyamide-/ethylene carboxyl-containing interpolymer blends. Moreover, the mono-, di-, and multi-functional acids of the present invention are found to inhibit the particular anhydride crosslinking of the carboxyl portion of ethylene carboxyl-containing interpolymers. However, anhydride crosslinking does not appear to occur at ordinary hot melt application temperatures inasmuch as common free-radical scavengers can adequately stabilize the ethylene carboxyl-containing interpolymer singularly or independently.

While good flowability and low viscosities are essential for successful hot melt application, interactive crosslinking results in extremely high viscosities and poor flow characteristics at ordinary application temperatures (i.e. $\geq 149°$ C.). This form of thermal instability is contradistinct from the well-known forms/mechanisms by which polyamides and ethylene carboxyl-containing interpolymers degrade. Polyamides principally degrade via non-oxidative free-radical crosslinking as well as chain-scission.

As mentioned above the polyamide resins of the present invention are well-known thermoplastic condensation reaction products of one or more dibasic acid and one or more diamine. The reaction provides a generally linear molecular structure and relatively high molecular weights (i.e., generally between about 1,000 and 12,000). Present commercially available polyamide resins as well as those useful in the present invention exhibit Ring and Ball softening points generally between about 25° to about 200° C., and Brookfield viscosities generally between about 10–130 poises at 190° C. but can be as little as about 1 to as much as about 500 poises at 190° C. The carboxyl-containing interpolymers of this invention include copolymers and terpolymers, where the carboxyl monomer(s) is an ethylenically unsaturated mono- or di-carboxylic acid and/or a vinyl ester of a $C_1$ to $C_6$ straight or branched chain aliphatic carboxylic acid. Examples of suitable carboxyl-containing polymers would include, but not be limited to, interpolymers of ethylene and acrylic acid, methacrylic acid, itaconic acid, maleic acid, fumaric acid, maleic anhydride, crotonic acid, or citraconic acid. Also suitable would be partially metal-neutralized ethylene interpolymers of acrylic acid and methacrylic acid. Blends of these various interpolymers would also be considered to be within the purview of this invention. Preferably, interpolymers of ethylene with acrylic acid or methacrylic acid are used. As used herein, the expression "EAA" means an ethylene/acrylic acid copolymer; the expression "EMAA" means an ethylene/methacrylic acid copolymer.

Interactive crosslinking was found during oven-aging tests of amide functional polymer/ethylene acrylic acid copolymer blends. The interactive crosslinking took the form of complete gelling of the blend/formulation within 24 hours of oven-aging at 177°–190° C. This gelation rendered the hot melt blend/formulation non-flowable and thus useless as a hot melt coating. Similar results occurred for two different 80/20 polyamide-/ethylene acrylic acid copolymer blends where a single EAA resin was alloyed with two different polyamides. In laboratory trial applications utilizing a hot melt applicator at 190° C., severe gel formation and extremely high viscosities were observed within 2–4 hours and again the formulation became extremely viscous. Additional evaluations demonstrated that blends/formulations comprised of less than 15 wt. percent of an EAA resin (which itself consisted of about 20 wt. percent acrylic acid with a 15 melt flow at 125° C.) were required to avoid appreciable gel formation in oven-aging tests at 190° C. where the polyamide had a intermediate Ring and Ball softening point (i.e., approximately 110° C.) and a relative low viscosity (i.e., 35 poises at 190° C.).

Where the polyamide had a fairly high Ring and Ball softening point (i.e., approximately 155° C.) and Brookfield viscosity (i.e., 90-115 poises at 190° C.) any and all blend proportions of about 20 weight percent acrylic acid ethylene copolymer caused severe gelling. This problem was solved by including low molecular weight dicarboxylic acids in the formulation to limit the reaction between polyamides and the EAA copolymer.

Other stabilizers which are effective free-radical scavengers, are recommended in addition to the dicarboxylic acids. These free-radical scavengers help to prevent any surface skinning or gel formation caused specifically by the EAA copolymer. The dicarboxylic acid would correspond to the following formula: $HOOC(R)_xCOOH$ wherein $R=(CH_2)$, (CHOH) or (CH), or combination of these, where x is an integer in the range of 1 to about 14.

The following examples illustrate particular embodiments, but the invention is not limited to the particular embodiments illustrated.

The following is provided as resin descriptions for the various resins provided in the examples.

Polyamide-1 (P-1) an acid-terminated polyamide with a 105°-115° C. Ring and Ball softening point and 30-40 poise Brookfield viscosity at 190° C.

Polyamide-2 (P-2) an acid-terminated polyamide with a 150°-160° C. Ring and Ball softening point and 90-115 poise Brookfield viscosity at 190° C.

Polyamide-3 (P-3) an acid-terminated polyamide with a 160°-170° C. Ring and Ball softening point and 70-90 poise Brookfield viscosity at 210° C.

Polyamide-4 (P-4) an amine-terminated polyamide with a 90°-105° C. Ring and Ball softening point and 35-50 poise Brookfield viscosity at 210° C.

EAA-1 an ethylene acrylic acid copolymer with about 20 wt. percent acrylic acid and about 15 melt flow at 125° C., (ASTM D-1238(B).

The blending of the components in these examples was done by melting them together in a vessel at 190° C., with stirring, using a forced-air oven, for about 0.5 to 1.0 hour. Other mixing means and devices may be employed, such as extrusion compounding.

The following illustrates the operable and preferred ranges of ingredients within the purview of this invention:

| ITEM | BLEND COMPOSITION (% by wt.)* | |
|---|---|---|
| | Operable | Preferred |
| ethylene/carboxyl-containing polymer | 5-95 | 10-30 |
| polyamide | 5-95 | 70-90 |
| carboxylic acid compatibilizer | 1-10 pph | 3-5 pph |
| free-radical scavenger | 0-5 pph | 0.5-1.0 pph |

*except where pph indicates parts per hundred parts of the polymer/polyamide blend.

The properties of the ethylene/carboxyl-containing polymers within the purview of the present invention are as follows:

| ITEM | RANGES | |
|---|---|---|
| | Operable | Preferred |
| carboxyl-containing comonomer, wt. % | 3-34 | 14-25 |
| melt flow value (MFV), ASTM-D-1238(B) | 1-500 | 10-150 |
| melt flow value (MFV), ASTM-D-1238(E) | 20-10000 | 200-300 |
| Brookfield Thermosel viscometer viscosity, cps | 1,000-1,000,000 | 10,000-400,000 |

The properties of the polyamides within the purview of the present invention are:

| ITEM | RANGES | |
|---|---|---|
| | Operable | Preferred |
| Viscosity (poise), as measured by a Brookfield viscometer, #3 spindle at 20 rpm | 0.1-500 | 30-120 |
| Ring and Ball softening pt., °C. (ASTM E28-587) | 220 | 100-190 |

The commercial and chemical identity of various free radical scavengers which may be used are exemplified, for example, as follows:

1. Mark 2047 (Witco Chemical), a thiodipropionate ester complex, a white powder having a melting point of 64°-72° C.;
2. Irganox 1010 (Ciba Geigy), tetrakis(methylene 3,5-di-t-butyl-4-hydroxyphenol))proprionate methane;
3. Distearylthiodiproprionate (DSTDP) Witco Chemicals;
4. Santanox R (Monsanto) 4,4-thio bis(6-5-butyl m-cresol);
5. Topanol CA (I.C.I.) 3:1 condensate of 3-methyl-6-t-butyl phenol with crotonaldehyde, a white crystalline powder, melting point of 182.5°-188° C.;
6. Dilaurylthiodiproprionate (DLTDP) Witco Chemicals.

The following test conditions are used for the data here, though other tests may be used:

| ITEM | METHOD |
|---|---|
| % AA or MAA in ethylene copolymer | ASTM-D4094 |
| MVF (melt flow value) | ASTM-D1238(B), except where noted |
| Oven aging-static test | samples left undisturmed in a forced air oven (air circulation rate approx. 375 ft³/min.) |
| Oven aging-color, gel formation, skinning | by visual inspection at recorded intervals |
| Viscosity Stability | Dynamic test-viscosity changes monitored using a Brookfield Thermosel viscometer (model RVTD, spindle 27, 20-50 Rpm) at 190° C.; viscosity measured (CPS) at various times (T). |

Item I (Table A) shows that when the carboxyl functional polymer (EAA-1) is blended with the acid-terminated polyamide, gelation occurred when the level of the carboxyl functional polymer was greater than fifteen percent. A flowable, non-gelling system was not obtainable when the carboxyl functional polymer was alloyed with an amine-terminated polyamide.

Items 2 and 3 (Table A) show that a more homogenous mixture which neither separates nor is altered by a chemical interaction (a more compatible system) is possible with the addition of a low molecular weight dicarboxylic acid (sebacic acid). The improved compatibility of the carboxyl functional polymer was possible when blending both the amine and acid terminated polyamide.

TABLE A

EAA/POLYAMIDE ALLOYS
(Forced Air Oven 190° C. for 24 Hours)

| Examples* | Alloys/Results** | | | | | | | |
|---|---|---|---|---|---|---|---|---|
| | A | B | C | D | E | F | G | H |
| Item 1 | | | | | | | | |
| EAA-1 (wt. %) | 15 | 25 | 50 | 85 | 15 | 25 | 50 | 85 |
| P-4 (wt. %) | — | — | — | — | 85 | 75 | 50 | 15 |
| P-1 (wt. %) | 85 | 75 | 50 | 15 | — | — | — | — |
| Irganox 1010 (pph) | .5 | .5 | .5 | .5 | .5 | .5 | .5 | .5 |
| Compatibility | C | G | G | G | G | G | G | G |
| Item 2 | | | | | | | | |
| EAA-1 (wt. %) | 15 | 25 | 50 | — | 15 | 25 | 50 | — |
| P-4 (wt. %) | 85 | 75 | 50 | — | 85 | 75 | 50 | — |
| Irganox 1010 (pph) | .5 | .5 | .5 | — | .5 | .5 | .5 | — |
| Sebacic Acid (pph) | 5 | 5 | 5 | — | 10 | 10 | 10 | — |
| Compatibility | C | C | G | — | C | C | G | — |
| Item 3 | | | | | | | | |
| EAA-1 (wt. %) | 15 | 25 | 50 | — | 15 | 25 | 50 | — |
| P-1 (wt. %) | 85 | 75 | 50 | — | 85 | 75 | 50 | — |
| Irganox 1010 (pph) | .5 | .5 | .5 | — | .5 | .5 | .5 | — |
| Sebacic Acid (pph) | 5 | 5 | 5 | — | 10 | 10 | 10 | — |
| Compatibility | C | C | G | — | C | C | G | — |

*P-1: Acid terminated polyamide
P-4: Amine terminated polyamide
EAA-1: Ethylene Acrylic Acid Copolymer
**C = Compatable
I = Phase Separation
G = Gelled Tables I, II, and II illustrate that a free radical stabilizer (Irganox 1010 or Mark 2047) can be used to thermally stabilize (retarding skinning and gelation) the polyamides (acid and amine-terminated) and the ethylene carboxyl-containing interpolymer. However, these stabilizers are ineffective in thermally stabilizing the polyamide/ethylene carboxyl-containing (EAA) blend.

TABLE I

EAA BASE RESIN STABILIZATION

1. Oven Aging (41 hrs at 190° C.)

| | Observations | | | | |
|---|---|---|---|---|---|
| Sample | Skinning | Gels | Color | Viscosity Initial | (CPS) Aged |
| EAA-1 (Control) | 100% | — | None | 25,100 | 47,100 |
| EAA-1 +3000 PPm Mark 2047 | 0% | Few Surface Gels | None | 23,600 | 44,900 |

2. Viscosity Stability (190° C.)

| Sample | Initial Viscosity, (CPS) | Hours to 10% Viscosity Change |
|---|---|---|
| EAA-1 (Control) | 25,100 | 12 |
| EAA-1 +3000 PPm Mark 2047 | 23,600 | 17/18.5 |
| P-1 (Control) | 11,875 | (31% decrease in 7.5 hrs., 1% for 7 hrs., 17% increase in 3.5 hrs.) |

TABLE II

UNSTABILIZED AND FREE-RADICAL STABILIZED EAA/POLYAMIDE BLENDS OVEN AGING (24 HRS AT 190° C.)

| Polyamide A | | Polyamide B | | EAA-1 | Stabilizer | | |
|---|---|---|---|---|---|---|---|
| Level (wt. %) | Type | Level (wt. %) | Type | Level (wt. %) | Level (wt. %) | Type | Result |
| 80 | P-1 | — | — | 20 | — | — | Gelled |
| 79.5 | P-1 | — | — | 20 | 0.5 | Mark 2047 | Viscous |
| 60 | P-1 | 20 | P-3 | 20 | — | — | Gelled |
| 60 | P-1 | 20 | P-4 | 20 | — | — | Gelled |
| 63 | P-1 | 20 | P-2 | 20 | — | — | Gelled |
| 99.5 | P-1 | — | — | — | 0.5 | I-1010 | Skinned Flowable |
| 100 | P-1 | — | — | — | — | — | Skinned Flowable |
| 100 | P-2 | — | — | — | — | — | Skinned Flowable |
| 50 | P-2 | — | — | 50 | — | — | Gelled |
| 50 | P-1 | — | — | 50 | — | — | Gelled |
| 50 | P-4 | — | — | 50 | — | — | Gelled |

TABLE III

EAA/POLYAMIDE BLENDS (UNSTABILIZED AND FREE-RADICAL STABILIZED) VISCOSITY STABILITY (190° C.)

| Polyamide A | | Polyamide B | | EAA-1 | Stabilizers | | Viscosity |
|---|---|---|---|---|---|---|---|
| Level wt. % | Type | Level wt. % | Type | Level wt. % | Level wt. % | Type | (CPS) At Time "T" (hrs) |
| 80 | P-1 | — | — | 20 | — | — | $T_0$ = 6750 |
| | | | | | | | $T_4$ = 10375 |
| 79.5 | P-1 | — | — | 20 | .5 | I-1010 | $T_0$ = 6625 |
| | | | | | | | $T_4$ = 9875 |
| 79.5 | P-1 | — | — | 20 | .5 | Mark 2047 | $T_0$ = 6750 |
| | | | | | | | $T_4$ = 9750 |
| 60 | P-1 | 20 | P-2 | 20 | — | — | $T_0$ = 7375 |
| | | | | | | | $T_4$ = 10000 |

Table IV illustrates that as the level of dicarboxylic acid is reduced, the compatibility of the carboxyl-functional polymer with various types of polyamides is also reduced.

TABLE IV

STABILIZED EAA BASED FORMULATION

| Polyamide A | | Polyamide B | | EAA-1 | Stabilizers | | Results (190° C.) | |
|---|---|---|---|---|---|---|---|---|
| Level wt. % | Type | Level wt. % | Type | Level wt. % | Level wt. % | Type | 24 hrs* | 40 hrs |
| 57 | P-1 | 19 | P-2 | 19 | 5.0 | Sebacic Acid | Flowable | Visc. but Flowable |
| 63 | P-1 | 19 | P-4 | 19 | 5.0 | Sebacic Acid | Flowable | — |
| 59 | P-1 | 19 | P2 | 19 | 3.0 | Sebacic Acid | Flowable | Very Visc. |
| 60 | P-1 | 20 | P-2 | 19 | 1.0 | Sebacic Acid | Flowable | Gelled |
| 74.5 | P-1 | — | — | 20 | 5.0 | Sebacic Acid | Flowable | Flowable |
|  |  |  |  |  | 0.5 | Mark 2047 |  |  |
| 45 | P-2 | — | — | 45 | 10 | Sebacic Acid | Visc. but Flowable | Gelled |
| 45 | P-1 | — | — | 45 | 10 | Sebacic Acid | 0.5" Gelling of Surface | Gelled |
| 45 | P-4 | — | — | 45 | 10 | Sebacic Acid | Gelled | — |

*All samples skinned within 24 hrs.

Table V shows that the thermal stability of polyamide (acid and amine-terminated)/carboxyl-functional polymer blends is significantly improved with the addition of the dicarboxylic acid. As the level of dicarboxylic acid is decreased so is the time interval before crosslinking starts or a significant increase in viscosity is noted.

TABLE V

STABILIZED EAA-BASED FORMULATION VISCOSITY STABILITY

| Polyamide A | | Polyamide B | | EAA-1 | Stabilizers | | Viscosity (CPS) At Time "T" (hrs) | | | |
|---|---|---|---|---|---|---|---|---|---|---|
| Level wt. % | Type | Level wt. % | Type | Level wt. % | Level wt. % | Type | $T_0$ (hrs) | $T_{15}$ (hrs) | $T_{24}$ (hrs) | $T_{40}$ (hrs) |
| 57 | P-1 | 19 | P-2 | 19 | 5 | Sebacic Acid | 3250 | 1150 | 1525 | 9000 |
| 63 | P-1 | 19 | P-4 | 19 | 5 | Sebacic Acid | 5000 | 1800 | — | — |
| 59 | P-1 | 19 | P-2 | 19 | 3 | Sebacic Acid | 6875 | 5375 | 19500 | — |
| 60 | P-1 | 20 | P-2 | 19 | 1 | Sebacic Acid | 8000 | 12500 | — | — |
| 74.5 | P-1 | — | — | 20 | 5 | Sebacic Acid | 3750 | 1850 | — | — |
|  |  |  |  |  | .5 | Mark 2047 |  |  |  |  |

To illustrate the effectiveness of this invention in coating applications each of the components were oven-aged and then coated onto Kraft paper, any problems with compatibility and thermal stability were observed (Table VI). Free radical stabilizers (Irganox 1010 and Mark 2047) reduced skinning and gel formation in the polyamides (acid- and amine-terminated) and reduced crosslinking and gels in the ethylene-acrylic acid resin.

TABLE VI

| Sample | 2 Hours | 4 Hours |
|---|---|---|
| 1. P-1 0 P* Irganox 1010 | some skinning, no gels | skinning, several gels |
| 2. P-1 0.5 P Irganox 1010 | no skin, no gels | no skin, 1 gel |
| 3. P-2 0 P Irganox 1010 | no skin, no gels | bad skinning, no gels |
| 4. P-2 0.5 P Irganox 1010 | no skin, no gels | very light skinning, 3 gels |
| 5. EAA-1 0 P Irganox 1010 | no skin, no gels | thick, bad skinning, bad gels |
| 6. EAA-1 0.5 P Irganox 1010 | no skin, no gels | thick, no skinning, 2 gels |
| 7. EAA-1 0.5 P Mark 2047 | no skin, no gels | thin, no skinning, 2 gels |
| 8. P-1 P-2 0 P Irganox 1010 | no skin, no gels | slight skin, 1 gel |
| 9. P-1 P-2 0.5 P Irganox 1010 | no skin, no gels | excellent |
| 10. P-1/P-2/EAA-1** 0 P Irganox 1010 | very thick, gels skinned | unpourable |
| 11. P-1/P-2/EAA-1 0.5 P Irganox 1010 | very thick, gels, skinned | bad skin, thick, bad gels |
| 12. P-1/P-2/EAA-1 0 P Irganox 1010, 5 P Sebacic Acid | thin, skinned no gels | thin, bad skinning, 2 gels |
| 13. P-1/P-2/EAA-1 0.5 P Irganox 1010, 5 P Sebacic Acid | no gels, some skinning | no skin, some skinning |
| 14. P-1/P-2/EAA-1 5 P Tartaric Acid 0.5 P Irganox 2047, | no skinning, no gels, unmelted tartaric acid | no skinning, 1 gel, unmelted tartaric acid |

*P = parts per hundred of sample used
**Each instance of P-1/P-2/EAA-1 is a 60%/20%/20%, respectively, resin mix.

The blend formulations of the present invention are useful as hot melt coatings on a wide variety of substrates, or as adhesive layers or bonding layers between a wide variety of substrates, such as metals, non-metals, glass, vitreous material, leather, paper, plastic, rubber, wood, fabric, etc. They are useful in bonding into a laminate, or other conglomerate structure, materials which are similar or dissimilar. They are especially useful for applications wherein they are applied to a first substrate, allowed to be cooled and stored, then subsequently heat-plasticized again to serve as an adhesive or bonding layer between the first substrate and a second substrate.

We claim:

1. A blend consisting essentially of
   (a) at least one polyamide,
   (b) at least one ethylene copolymer containing carboxylic acid groups, and
   (c) a minor amount of at least one organic carboxylic acid in an amount effective to improve the compatibility and thermal stability of the blend, said organic carboxylic acid(s) being characterized as melting in, or dissolving in, the blend at the temperature employed for the blending operation, and being reactable with any functional amine groups which are present in the blend at the blending temperature or which become available through chain scission or degradation of the polyamide at such temperature,
   wherein said ethylene copolymer is at least one selected from the group consisting of ethylene/acrylic acid, ethylene/methacrylic acid, ethylene/crotonic acid, and ethylene/1-butenoic acid, and
   wherein said organic carboxylic acid consists of at least one of
   (i) HOOC—R—COOH, wherein R is $C_1$-$C_{14}$ alkylene or alkenylene or OH substituted $C_1$-$C_{14}$ alkylene or alkenylene or combinations of these,
   (ii) multi-carboxylic acid compounds of the group consisting of citric acid, pyromellitic acid, and EDTA.

2. The blend of claim 1 wherein the polyamide is at least one of the nylon varieties.

3. The blend of claim 1, further characterized as containing a minor amount of at least one antioxidant in addition to the organic carboxylic acid.

4. The blend of claim 1 wherein the organic carboxylic acid is sebacic acid or tartaric acid.

5. The blend of claim 1 wherein the carboxylic acid-containing ethylene polymer comprises a polymer of ethylene with acrylic acid or methacrylic acid.

6. The blend of claim 1 wherein the carboxylic acid-containing ethylene polymer comprises a random, homogeneous, interpolymer of ethylene and acrylic acid wherein the ethylene moiety comprises at least about 65% by weight of the interpolymer.

7. A blend consisting essentially of
   (a) about 5% to about 95% of a copolymer of ethylene/acrylic acid or ethylene/methacrylic acid,
   (b) about 5% to about 95% of at least one polyamide, and
   (c) about 1% to about 10% of at least one organic carboxylic acid which consists of
   (i) HOOC—R—COOH, wherein R is $C_1$-$C_{14}$ alkylene or alkenylene or OH substituted $C_1$-$C_{14}$ alkylene or alkenylene or combinations of these,
   (ii) multi-carboxylic acid compounds of the group consisting of citric acid, pyromellitic acid, and EDTA, and
   (d) from zero to about 5% of a free-radical scavenger or antioxidant.

8. The blend of claim 7 consisting essentially of
   (a) about 10% to about 30% of the said copolymer,
   (b) about 70% to about 90% of the polyamide,
   (c) about 3% to about 5% of the said organic carboxylic acid, and
   (d) from 0.5 to about 1% of a free-radical scavenger or antioxidant.

9. A blend consisting essentially of
   about 5% to about 95% of a random, homogeneous interpolymer of ethylene and acrylic acid wherein the ethylene moiety comprises at least about 65% by weight of the interpolymer,
   about 5% to about 95% of at least one polyamide,
   about 1% to about 10% of at least one dicarboxylic acid of the group represented by the formula —HOOC—R—COOH, wherein R is $C_1$-$C_{14}$ alkylene or alkenylene or OH substituted $C_1$-$C_{14}$ alkylene or alkenylene or combinations of these,
   from zero to about 5% of a free-radical scavenger or antioxidant.

10. A method for improving the compatibility and thermal stability of a blend which consists essentially of a polyamide and a copolymer of ethylene/acrylic acid or ethylene/methacrylic acid, said method comprising
    incorporating into said blend a compatibilizer agent comprising a dicarboxylic acid of the formula —HOOC—R—COOH, wherein R is $C_1$-$C_{14}$ alkylene or alkenylene or OH substituted $C_1$-$C_{14}$ alkylene or alkenylene or combinations of these.

11. The method of claim 10 wherein
    the dicarboxylic acid comprises sebacic acid or tartaric acid.

12. The method of claim 10 wherein the blend comprises
    (a) about 5% to about 95% of the polyamide,
    (b) about 5% to about 95% of the said copolymer,
    (c) about 1% to about 10% of the compatibilizer agent, and
    (d) from zero to about 5% of a free-radical scavenger or antioxidant,
    all amounts being percent of the total blend.

13. A composite article comprising a substrate having adhered to at least a portion thereof the blend of claim 1.

14. The composite of claim 13 wherein the substrate is metallic, vitreous, leather, paper, plastic, rubber, wooden, or fabric.

15. The composite of claim 13 wherein the blend comprises a layer between a first substrate and a second substrate, where the first substrate and the second substrate are of similar or dissimilar material.

* * * * *

UNITED STATES PATENT AND TRADEMARK OFFICE
CERTIFICATE OF CORRECTION

PATENT NO. : 4,602,058
DATED : July 22, 1986
INVENTOR(S) : Stephen L. Graham and Laura A. Kelly It is certified that error appears in the above-identified patent and that said Letters Patent is hereby corrected as shown below:

Col. 2, line 51; change "are" to --and--.

Col. 4, line 16; change "of" to --or--.

Col. 4, line 66; change "hexadecandoic" to --hexadecandioic--.

Col. 8, line 24; change "220" to --25-220--.

Col. 8, line 34; change "3,5-di-t-butyl-4-hydroxyphenol)proprionate" to --3,5-di-t-butyl-4-hydroxyphenol)propionate--.

Col. 8, line 36; change "Distearylthioproprionate" to --Distearylthiopropionate--.

Col. 8, line 43; change "Dilaurylthioproprionate" to --Dilaurylthiopropionate--.

Col. 8, line 54; change "undisturmed" to --undisturbed--.
Col. 14, line 7; change "ahout" to --about--.
Col. 9, line 37; change the 2nd occurrence of "II" to --III--.

Signed and Sealed this

Eighth Day of September, 1987

Attest:

DONALD J. QUIGG

Attesting Officer

Commissioner of Patents and Trademarks